United States Patent [19]

Van Leeuwen et al.

[11] Patent Number: 4,665,048

[45] Date of Patent: May 12, 1987

[54] CATALYST SUITABLE FOR HYDROTREATING

[75] Inventors: Willem A. Van Leeuwen, Vlaardingen; Eduard K. Poels, Leyden; Leendert H. Staal, Hoogvliet; Dirk Verzijl, Barendrecht, all of Netherlands

[73] Assignee: Internationale Octrooi Matschappij "Octropa" B.V., Rotterdam, Netherlands

[21] Appl. No.: 806,459

[22] Filed: Dec. 9, 1985

[30] Foreign Application Priority Data

Dec. 7, 1984 [NL] Netherlands ................. 8403739
Jul. 8, 1985 [NL] Netherlands ................. 8501945

[51] Int. Cl.$^4$ .................. B01J 27/049; B01J 21/18; B01J 23/00
[52] U.S. Cl. .................. 502/221; 502/174; 502/314
[58] Field of Search .................. 502/221, 174, 314

[56] References Cited

U.S. PATENT DOCUMENTS

| | | | |
|---|---|---|---|
| 1,956,585 | 5/1934 | Oglesby et al. | 502/184 X |
| 3,242,101 | 3/1966 | Erickson et al. | 502/314 |
| 3,496,117 | 2/1970 | Vesely et al. | 502/314 |
| 3,661,805 | 5/1972 | Horvath | 502/314 |
| 3,716,497 | 2/1973 | County | 502/314 X |
| 3,810,830 | 5/1974 | Klenken et al. | 208/111 |
| 3,873,470 | 3/1975 | Conway et al. | 502/314 |
| 3,928,180 | 12/1975 | Hilfman | 502/314 X |
| 3,935,127 | 1/1976 | Conway | 502/314 |
| 4,036,784 | 7/1977 | Gembicki et al. | 502/314 |
| 4,046,714 | 9/1977 | O'Hara | 502/314 X |
| 4,064,152 | 12/1977 | McArthur | 502/335 X |
| 4,081,353 | 3/1978 | Kehl et al. | 502/314 X |
| 4,097,413 | 6/1978 | Simpson | 502/314 |
| 4,120,826 | 10/1978 | Ebel et al. | 502/314 |
| 4,128,505 | 12/1978 | Mikovsky et al. | 502/221 X |
| 4,166,101 | 8/1979 | Neel et al. | 502/314 X |
| 4,293,449 | 10/1981 | Herrington et al. | 502/314 X |
| 4,448,896 | 5/1984 | Kogeyama et al. | 502/314 |
| 4,483,942 | 11/1984 | Sekido et al. | 502/314 X |

FOREIGN PATENT DOCUMENTS

| | | | |
|---|---|---|---|
| 0147817 | 4/1981 | German Democratic Rep. | 502/314 |
| 2131714A | 6/1984 | United Kingdom | 502/314 |

*Primary Examiner*—Andrew H. Metz
*Assistant Examiner*—William G. Wright
*Attorney, Agent, or Firm*—Cushman, Darby & Cushman

[57] ABSTRACT

The invention provides catalysts suitable for hydrotreatment of mineral oil which contain an oxide and/or sulphide derived from a metal of Group VI (B) and one from Group VIII metal and a transition alumina and which show an oxygen chemisorption above 185 micromoles per gram, preferably between 200 and 300. Preferably tha catalysts are free from anions of strong mineral acids.

These catalysts can be prepared by impregnation of a transition alumina with an ammoniacal metal solution having an initial pH between 10.5 and 13, preferably between 11.0 and 12.5.

12 Claims, No Drawings

CATALYST SUITABLE FOR HYDROTREATING

The application relates to a catalyst for hydrotreatment of mineral oil and fractions thereof so that the oil is dehydro-sulphurized (=HDS), dehydronitrogenized (HDN) and/or hydrogenated (HYD), i.e. that organic sulphur compounds are converted into hydrogen sulphide, organic nitrogen compounds are converted into ammonia and unsaturated compounds are converted into saturated compounds. Such catalysts are also useful for removing oxygen and/or metals (HDO and HDM, respectively) and for hydrocracking. Also, such catalysts are used in the processing of synthetic, crude oil (syncrudes) and liquefied coal.

Depending on the desired improvement in the mineral oil (fraction) one or more of the hydrotreatment reactions as mentioned above is desirable (e.g. only HDS or HDS and HDN). This desired selectivity in the hydro-treatment process can be obtained to some extent by choosing the appropriate process conditions and by choosing a suitable catalyst.

These catalytic conversions are large scale industrial operations in the upgrading and refining of mineral oil fractions and, consequently, there is a need of suitable catalysts of varying selectivites and high activity. Generally, for this purpose combinations of metal sulphides of Group VI B and Group VIII are used on a carrier. As a rule, these catalysts are sulphidated in situ and consequently are offered and sold in a form consisting of oxides. As carrier material, a transition alumina is preferably used, particularly gamma-alumina.

Under a transition alumina is to be understood the intermediate forms which are obtained by thermal decomposition of aluminium hydroxide. These transition aluminas contain less than 0.5 mole of water per mole of $Al_2O_3$, depending on the temperature up to which they have been treated. Well-known transition aluminas are gamma, eta and chi (partly crystallized), as well as kappa, theta and delta, the last three being better crystallized than the first three. Preferred are aluminas having a pore volume of 0.4–1.0 ml/g.

Sometimes—for special applications—it is advantageous to incorporate also some (up to 25%, preferably less than 10%) amorphous and/or crystalline aluminium silicate in the carrier material. As a rule, the carrier material is applied as pre-formed particles, i.e. as extrudate, globules, rods and such-like.

More particularly, often combinations of cobalt or nickel, on one hand, and molybdenum or tungsten, on the other hand, are used on shaped carrier material predominantly consisting of transition alumina.

Catalysts of this type and their preparation are known from prior art. Thus U.S. Pat. No. 4 399 058 (Gulf Research) mentions catalysts, in which alumina is impregnated with an ammoniacal solution of nickel sulphate and a molybdenum salt. According to column 9, lines 14–32, impregnation is carried out with an ammoniacal solution having pH 8.4 (in the absence of the molybdate the pH would have been about 10.).

Also GB-A-1 368 795 (Pechiney-Saint Gobain) discloses similar catalysts based on an aluminous support which are impregnated with ammoniacal nickel nitrate solutions.

Likewise, GB-A-1 408 760 (Shell Int. Research Min.) discloses such catalysts, prepared from a range of support materials, with e.g. diluted ammoniacal solutions of molybate and nickel/cobalt chloride, carbonate or acetate. Nitrates are disclosed in ammoniacal (2–3%) solutions which show a pH between 6 and 7.5.

There is also NL-A-8303538 (Nippon Oil), in which it is disclosed that an ammoniacal solution of a metal carbonate, together with an organic acid, such as tartaric acid or malic acid at a pH between 8.5 and 10.0.

Finally there is U.S. Pat. No. 3 810 830 (J. van Klinken et al, assigned to Shell Int. Res. Mij) disclosing catalysts based on a silica/alumina hydrogel which is impregnated with metal combinations such as nickel and molybdenum, preferably as carboxylates and amine complexes.

It has now appeared that the cobalt-molybdenum catalyst is active for HDS but barely active for HDN, while the cheaper nickel-molybdenum catalyst is active for HDN but less active for HDS when compared with the cobalt-molybdenum catalyst. The nickel-tungsten catalyst is especially active for the hydrogenation of aromatic compounds and further moderately active for HDS and HDN. The nickel-molybdenum catalyst is also used for this application.

Consequently, there is need for a catalyst, preferably on the basis of the cheaper nickel, which combines a high HDS with a high HDN and high activity for the hydrogenation of aromatic compounds. In particular there is in this connection need for catalysts with a low metal content, or possibly "normal" meal content, having improved catalytic properties.

It has now been found that catalysts having an excellent selectivity and activity can be prepared by impregnating shaped alumina particles with an ammoniacal metallic solution having a particularly high pH value, namely between 10.5 and 13, preferably between 11.0 and 12.5, and subsequently evaporating the impregnated alumina particles to dryness, calcining and sulphiding.

The impression exists that the better properties are connected with a very fine dispersion of the active phase and a decreased formation of a metal of Group VIII, in particular nickel, aluminate, which metal aluminates are catalytically inactive. Moreover, at the higher pH value polymeric molybdate could form to a lesser degree, thus resulting in a lower tendency for nickel to segregate from the molybdenum.

During the evaporation of the impregnated carrier material to dryness, ammonia gas escapes, as a result of which the pH drops. On theoretical grounds, however, it is to be expected that, with the process according to the present invention, this seldom drops to values below 8.5–9.0.

If, in the ammoniacal metal solution, considerable amounts of anions of stronger acids occur, particularly of strong mineral acids, such as sulphuric acid and nitric acid, it can then be expected that these will bring about an important reduction of the pH, not only during the evaporation but already in the starting pH. It is therefore recommendable that the impregnation liquid (in the present case the ammoniacal metal solution) be completely or substantially free of anions which are derived from acids stronger than carbonic acid and particularly be free, or substantially free, of anions of strong mineral acids and free of amions strongly binding to transition metals such as anions of organic acids.

Therefore an ammoniacal metal solution can be prepared by dissolving finely divided metal of Group VIII in a solution of ammonium carbonate in ammonia and passing through oxygen. The solution of ammonium carbonate in ammonia is prepared conveniently by passing carbon dioxide through a solution of ammonia. The ammoniacal metal solution then contains substantially carbonate and/or hydroxyl ions as anions. This includes hydroxycarbonate ions.

Alternatively, the ammoniacal metal solution can also be prepared by dissolving group VIII metal, more in particuar nickel/cobalt carbonate in concentrated ammonia whilst refluxing and subsequent addition of ammonium carbonate and/or carbamate. The ammonium molybdate/tungstate or another group VI compound is then added, and a solution with a pH between 10.5 and 13.0 results.

The present invention provides a novel, highly active catalyst with a well dispersed active phase. These catalysts are very active for hydrodesulphurization and hydrodenitrogenation, even when the catalysts contain low percentages of metal(s).

The catalysts contain 0.5–20, preferably 1–10% by weight, calculated on the catalyst, of the metal of Group VIII, and 2.5–60, preferably 10–25% by weight of the metal of Group VI, while their ratio lies between 40:1 and 1:5, preferably between 1:1 and 1:3 (Group VIII to Group VI).

The high activity is related to the well-dispersed active phase which is reflected by oxygen chemisorption values of above 185 micromoles oxygen per gram catalyst (measured in the sulphided state according to Applied Catalysis 17 (1985), 273–308, Elsevier Science Publ.). Preferably the oxygen chemisorption values range between 200 and 300 and values between 240 and 270 are typical.

TABLE I

| Catalyst of Example | III | VIII | Ref.* |
|---|---|---|---|
| NiO (weight percentage) | 4.9 | 2.7 | 4 |
| MoO$_3$ (weight percentage) | 20.2 | 13 | 19.5 |
| BET Surface area (sqm/g) | 210 | 248 | 177 |
| Oxygen chemisorption (micromoles/g) | 257 | 245 | 166 |
| HDS/HDN activity (relative weight activity) | 110/84 | 120/59** | 100/100 |
| Compacted bulk density (g/ml) | .76 | .68 | .87 |

*The reference catalyst is promoted with P$_2$O$_5$ to boost HDN-activity, whereas catalysts of Examples 3 and 8 do not contain P$_2$O$_5$.
**Tested here with a light cycle oil (LCO) which was different from that used in the test of the activities of catalysts below.

The high degree of dispersion is also reflected by the BET-surface area data of the catalysts in the oxidic state. From surface areas determined for the carrier and the finished catalyst the surface area retention factor (RF) was calculated according to $$RF = \frac{100}{\text{carrier content cat.}\cdot(\% \, ww)} \times \frac{\text{surface area cat } (sqm/g)}{\text{surface area support } (sqm/g)}$$

The surface area retention factors (RF) of the catalysts according to the present invention are between 105 and 120 (unless the catalyst is P$_2$O$_5$-promoted) which indicates that the precursor of the active phase is well-dispersed.

It is assumed that anions of mineral acids or anions strongly binding to transition metal (such as organic acids) when present in the catalyst precursor affect the dispersion of the active phase.

It will be clear that in this way a catalyst according to the invention will be obtained which is substantially free of anions which are derived from stronger acids, in particular free of mineral acids.

After the carrier has been impregnated at least once with the above-mentioned ammoniacal solution, it is dried and calcined. The drying generally takes place at temperatures between 50° and 150° C., whereafter calcining is carried out at a temperature which usually lies between 150° and 650° C. The catalyst, in the form thus obtained of the phase consisting of oxides, is ready to be marketed.

It is self-evident that the original form and the properties of the carrier material remain for the greater part the same, but processing can, for example, influence the porosity.

During the impregnation with solutions of salts of metals of Group VI and Group VIII in ammonia, but also thereafter or beforehand, one or more promoters can be incorporated in the catalyst. Suitable promoters (1–10% w.w.) are for example calcium oxide, zinc oxide, barium oxide and P$_2$O$_5$.

Before the catalyst is used, it should first be sulphided. This sulphiding can take place by bringing the catalyst into contact with a sulphur-containing compound, for example hydrogen mixed with hydrogen sulphide, carbon disulphide or a mercaptan. This can be carried out conveniently in situ, sometimes with sulphur-containing mineral oil. The oxide is thereby converted completely or substantially into sulphide. After the catalyst has been sulphided, it is ready for use.

The hydrotreatment according to the invention takes place with a catalyst such as described above, depending on the mineral oil (fraction) and the catalyst, as well as on the desired conversions (HDS, HDN, HDO, HYD, HDM) carried out under very diverse conditions.

The total pressure (mainly the hydrogen pressure) can vary between $10.10^5$Pa and $300.10^5$Pa; hydrogen/oil (fraction) ratio between 1–2500 m$^3$/m$^3$; the reaction temperature varies between 100° and 500° C.

The properties of the catalyst are determined in the present application according to standard test procedures which are described below.

Test procedure:
Determination of catalytic activity. The hydrogenolytic activity of catalysts is determined on the basis of the catalysed conversion of organic sulphur and nitrogen compounds with hydrogen, during which hydrogen sulphide (H$_2$S) and ammonia (NH$_3$) are foormed, together with hydrocarbons.

The hydrogenating activity of catalysts is determined on the basis of the catalysed hydrogenation of cyclohexene.

The test is carried out in a heated tubular reactor having an internal diameter of 12 mm, provided with a thermocouple well with 5 temperature read-outs, of which 3 are utilized to measure the temperature at the top, in the middle and at the bottom of the catalyst bed.

A synthetic feed consisting of 5% thiophene, 1.6% pyridine, (optionally) 5% cyclohexene and toluene (balance up to 100%) is circulated at a constant speed, passes a pre-heating coil, with which the temperature is raised to the indicated reaction temperature, and is subsequently led together with hydrogen over the catalyst bed. Alternatively, a mineral oil fraction can be used as feedstock.

The catalyst bed consists of 3 g ground and sieved catalyst particles having a particle diameter between 0.25 and 1.0 mm, onto which a bed of 6 g silicon carbide has been applied. The silicon carbide having a particle size distribution which is identical with that of the catalyst serves as pre-heating zone and provides for good mixing of the feed with hydrogen. The catalyst is sulphided with 10% H₂S in H₂ before the reaction is started. The sulphided and test conditions are given in Table 2.

TABLE 2

| | Sulphiding conditions |
|---|---|
| Temperature | 400° C. (heating rate 5° C./min.) |
| Reaction time | 1 h at 400° C. |
| Gas | 10% H₂S in H₂ |
| Flow | 500 ml H₂S/H₂ per minute |
| Pressure | 10⁵ Pa |
| | Test conditions |
| Feed | 5% thiophene, 1.6% pyridine (sometimes also 5% cyclohexene) in toluene |
| Catalyst | 3 g broken catalyst particles sieved so as to obtain 0.25-1.0 mm fractions |
| Feeding | 0.4 ml/min. (liquid) |
| Hydrogen | 100 ml/min. |
| Temperature | 12 h at 325° C., followed by 8 h at 375° C. |
| Pressure | 10.10⁵ Pa |

By GLC techniques, the reaction product is analysed continuously on-line.

The catalytic activity of a catalyst is determined 12 hours after starting the test on the basis of the hydrodesulphurization of thiophene at 325° C. and expressed according to:

$$\% \text{ HDS (hydrodesulphurization)} = \left[1 - \frac{C\text{thio}}{C°\text{thio}}\right] \times 100\%$$

$C°$thio = thiophene concentration in the feed.
$C$thio = thiophene concentration in the reaction product.

The activity of a catalyst in the hydrodenitrogenization of pyridine was determined 20 hours after starting of the experiment at 375° C. and expressed according to:

$$\% \text{ HDN (hydrodenitrogenization)} = \left[1 - \frac{C\text{pyr} + C\text{pip}}{C°\text{pyr}}\right] \times 100\%$$

$C°$pyr = pyridine concentration in the feed.
$C$pyr = pyridine concentration in the reaction product.
$C$pip = piperidine concentration in the reaction product.

The hydrogenating activity on cyclohexene is expressed in a manner identical with that described above for the hydrogenolytic activity on thiophene and pyridine.

For hydrogenolysis and hydrogenation the relative activity is expressed with respect to a reference catalyst according to:

$$RWA = \frac{k}{k_{ref}} \times 100\% = \frac{\ln(C\text{thio}/C°\text{thio})}{\ln(C^{ref}\text{thio}/C°\text{thio})}$$

(hydrodesulphurization)

$$= \frac{\ln(C\text{pyr} + C\text{pip}/C°\text{pyr})}{\ln(C^{ref}\text{pyr} + C^{ref}\text{pip}/C°\text{pyr})}$$

(hydrodenitrogenization)

$$= \frac{\ln(C\text{cyclohex}/C°\text{cyclohex})}{\ln(C^{ref}\text{cyclohex}/C°\text{cyclohex})}$$

(hydrogenation)

RWA = relative weight activity.
$C^{ref}$thio = thiophene concentration in the reaction mixture for the reference catalyst.
$C^{ref}$pyr, $C^{ref}$pip, $C^{ref}$cyclohex = as above, but for pyridine, piperidine and cyclohexene.
k = reaction speed constant.
$k^{ref}$ = reaction speed constant for reference catalyst.

When hydrotreating mineral oil fractions, e.g. light cycle oil and/or light gas oil), the RWA is calculated, assuming pseudo-higher order kinetics (n is at least 1) using the following equation:

$$RWA = \frac{[Cs, \text{sample}]^{1-n} - [Cs^o]^{1-n}}{[Cs, \text{ref.}]^{1-n} - [Cs^o]^{1-n}} \times 100\%$$

where
$Cs$ = sulphur content in the product
$Cs^o$ = sulphur content in the feed
n = order of the reaction An analogous equation applies for calculation of RWA for HDN.

RVA's can be calculated as follows:

$$RVA = \frac{BD}{BD_{ref}} \times RWA$$

where
RVA = Relative Volume Activity in %
BD = Builk Density in kg/l

The sulphiding procedure for the catalysts when hydrotreating realistic feedstocks is the same as described in Table I. Test conditions for NiMo and CoMo catalysts are given in Tables II and III, respectively.

TABLE 3

| Test conditions for NiMo catalysts | |
|---|---|
| Feed | LCO* |
| % S | 2.41 |
| ppm N | 890 |
| Diesel index | 5 |
| % Ar | 86.9 |
| Catalyst | 3 g broken particles 0.25-1.0 mm |
| Bed volume | 9 ml |
| LHSV | 4 h⁻¹ |
| H₂/oil | 350 Nm³/m³ |
| Pressure | 70 atm. |
| Temp. | 370° C. |
| Assumed reaction order | 1.5 |

TABLE 4

| Test conditions for Co—Mo catalysts | |
|---|---|
| Feed | LGO*/LCO = 1/1 (v/v) |
| % S | 1.76 |
| ppm N | 500 |
| Catalysts | 3 g broken particles 0.25 mm-1.0 mm |
| Bed volume | 9 ml |
| LHSV | 4 h⁻¹ |
| H₂/oil | 350 Nm³/m³ |
| Pressure | 70 atm. |
| Temp. | 325; 350; 370° C. |

TABLE 4-continued

| Test conditions for Co—Mo catalysts | |
|---|---|
| Assumed reaction order | 1.3 |

*LGO = Light Gas Oil
<sup>a</sup>LCO = Light Cycle Oil

[note: a=LGO correction]

*LGO = Light Gas Oil
*LCO = Light Cycle Oil

As reference catalyst, two frequency used industrial catalysts are used, having the following metal contents:

| Commercial catalyst | % $MoO_3$ | % NiO | % CoO |
|---|---|---|---|
| A (U.S.A.) | 20.0 | 5.0 | — |
| B (European) | 15.7 | — | 4.6 |

The invention will now be illustrated on the basis of the following Examples.

EXAMPLE I

A. Preparation of ammoniacal Ni solution

$NiCO_3$-49% Ni (450 g) was dissolved together with ammonium carbamate in 2 liters of 25% ammonia by stirring the mixture for 3 hours at 50° C. under reflux of ammonia. This solution has a pH of 12.1 and contains 0.1347 g NiO/ml.

B. Preparation of catalyst I

80 g of a pre-formed alumina (interior surface area 270 m²/g, pore volume 0.7 ml/g, 1.6 mm extrudate) was impregnated with a solution consisting of:

25 ml of the ammoniacal nickel solution of Example I A. 23.6 g $(NH_4)_6Mo_7O_{24}.4H_2O$, supplemented with water to 120 ml.

60 ml of this solution was absorbed by the catalyst carrier. The catalyst was dried at 120° C. and subsequently calcined, the temperature being increased by 5° C. per minute up to 450° C. and thereafter being kept for 2 hours at 450° C.

The finished catalyst I contained 1.8% NiO and 10.8% $MoO_3$.

EXAMPLE II

A. Preparation of ammoniacal Ni-solution

Preparation of an ammoniacal nickel solution by dissolving finely divided nickel powder (200 g having an average particle size of 50 μm) in 6.3 l aqueous ammonia/ammonium bicarbonate with $NH_4HCO_3/Ni=2$ (<sup>mol</sup>/mol) and $NH_3/Ni=7$ (<sup>mol</sup>/mol). At 50° C., 80 l air was injected under cooling for 8 hours. This solution has a pH of 10.8 and a nickel content of 0.0402 g NiO/ml.

B. Preparation of catalyst II

20 g of a pre-formed carrier (internal surface area 260 m²/g, pore volume 0.7 ml/g, 1.5 mm extrudate) was impregnated with a solution consisting of:

70 g $(NH_4)_6Mo_7O_{24}.4H_2O$, 3.3 ml 25% ammonia solution in 24.7 ml demineralized water.

14 ml of this solution was absorbed by the catalyst carrier. The impregnated carrier was dried in a stream of air at 75° C. for one night. Subsequently the catalyst carrier impregnated with molybdenum oxide was impregnated with the ammoniacal nickel solution according to Example II A. The catalyst was dried in a stream of air at 75° C. for one night and subsequently calcined as in Example I.

The finished catalyst II contained 1.7% NiO and 12.1% $MoO_3$.

EXAMPLE III

The procedure of Example I was followed; however, the impregnation was carried out with a solution consisting of:

86 ml of the ammoniacal nickel solution of Example I A 54.4 g $(NH_4)_6Mo_7O_{24}.4H_2O$, supplemented with water to 140 ml.

The finished catalyst III contained 4.9% NiO and 20.2% $MoO_3$.

EXAMPLE IV

Preparation of an ammoniacal cobalt solution.

Basic cobalt carbonate ($Co_2(OH)_2CO_3.nH_2O$; 45.5% Co), 77 g, and ammonium carbamate, 164 g, in 500 ml 25% ammonia were heated for 3 hours to 45° C., under reflux of ammonia. Subsequently 15 g ammonium bicarbonate was added and the mixture was stirred for 16 hours at 45° C. under reflux of ammonia.

This solution has a pH of 12 and contains 0.081 g CoO per ml.

80 g of a pre-formed alumina carrier (internal surface area 260 m²/g, pore volume 0.7 ml/g, 1.6 mm extrudates) was impregnated with a solution consisting of:

46.8 ml of the ammoniacal cobalt solution 17.6 g $(NH_4)_6Mo_7O_{24}.4H_2O$, supplemented with water to 120 ml.

During the impregnation, 65 ml of this solution was absorbed by the catalyst carrier.

The catalyst was dried for one night at 120° C. and subsequently calcined, the temperature being increased by 5° C. per minute up to 500° C. and thereafter being kept for 2 hours at 500° C.

The finished catalyst IV contained 2.3% CoO and 8.6% $MoO_3$.

EXAMPLES V–VIII

The catalysts I to IV were tested in accordance with the test procedure described above. The results are given in the Table below.

TABLE 5

Composition and relative activities of the catalysts described in the Examples

| Catalyst | wt. % NiO | wt. % CoO | wt. % $MoO_3$ | RWA(S)[a] | RWA(N)[b] | RWA(H)[a] | Ref. Cat. |
|---|---|---|---|---|---|---|---|
| I | 1.8 | — | 10.8 | 140 | 150 | 160 | A |
| II | 1.7 | — | 12.1 | 110 | 100 | 160 | A |
| III | 4.9 | — | 20.2 | 160 | 150 | — | A |
| IV | — | 2.3 | 8.6 | 155 | 120 | 170 | B |

The test procedure as described above was followed, wherein:

a = The relative activities for hydrodesulphurization and the hydrogenation of cyclohexene were determined at 325° C.

b = The relative activity for hydrodenitrogenization was determined at 375° C.

EXAMPLE IX 100 g of a shaped alumina carrier (internal surface area 250 m²/g, pore volume 0.64 ml/g, 1.5. mm extrudates) was impregnated with 4.9 g basic zinc carbonate (Zn(OH)$_2$CO$_3$) dissolved in 70 ml of a 25% ammoniacal solution in water (pH=12). After the excess liquid had been filtered off, 55 ml of the solution appeared to have been absorbed. The impregnated catalyst carrier was dried for 16 hours at 120° C. and calcined 2 hours at 400° C. (heating rate=5° C./min.). The zinc content was now 2.65 wt.% ZnO. 35 g of the impregnated and calcined carrier was now impregnated with 19.3 ml of a nickel-complex-containing solution, which had been prepared as described in Example I A (0.1248 g NiO/ml), supplemented with demineralized water up to 45 ml and with 11.8 g of ammonium heptamolybdate dissolved therein. 33 ml of this solution was absorbed by the pre-treated catalyst carrier.

After drying for 16 hours at 75° C. and calcining for 2 hours at 400° C. (heating rate=5° C./min.), the finished catalyst V contained 4.0% NiO, 16.1% MoO$_3$ and 2.1% ZnO.

The activities which were obtained by the above-described test procedure were with respect to Ref. A: RWA (HDS) 185%; RWA (HDN) 160%; RWA (HYD) 170% (see also the conditions indicated in Examples V–VIII).

EXAMPLES X THROUGH XIX

By procedures described in Example I, catalysts VI–XV were prepared, using different relative quantities of of metal compounds.

The catalysts VI through XV were tested in accordance with the test procedures described in Tables II and III. The results are given in Table V.

TABLE 6

| Catalyst | Wt % NiO | Wt % CoO | Wt % MoO$_3$ | Wt % P$_2$O$_5$ | RWA(S) % | RWA(N) % | Ref. cat. | RF |
|---|---|---|---|---|---|---|---|---|
| VI | 4.4 | — | 19.2 | — | 114 | 70 | A | 106 |
| VII | 2.8 | — | 12.4 | 7.1 | 108 | 85 | A | 93 |
| VIII | 4.3 | — | 17.0 | 6.6 | 128 | 110 | A | 90 |
| IX | 2.7 | — | 13.0 | — | | | A | 105 |
| X | 5.0 | — | 21.0 | 5.5 | 108 | 103 | A | — |
| XI | — | 3.7 | 10.8 | — | 100 | 100 | B | 117 |
| XII | — | 3.8 | 12.0 | — | 107 | 100 | B | 110 |
| XIII | — | 4.3 | 14.0 | — | 138 | 134 | B | 115 |
| XIV | — | 4.8 | 12.2 | 3.2 | 131 | 122 | B | 107 |
| XV | — | 4.8 | 15.9 | — | 138 | 134 | B | 116 |

We claim:

1. A process for the preparation of a catalyst which contains a metal of Group VIII and a metal of Group VI (B) as well as a carrier material, by impregnating shaped particles containing transition alumina with an ammoniacal solution which contains these metals, thereafter evaporating to dryness, calcining and sulphiding, characterized in that shaped particles are impregnated with an ammoniacal metal solution which has an initial pH between 10.5 and 13, and which is substantially free of anions, which are derived from acids stronger than carbonic acid.

2. A process according to claim 1, characterized in that the ammoniacal metal solution with which impregnation is carried out contains no anions derived from strong mineral acids.

3. A process according to claim 1 or 2, characterized in that the ammoniacal metal solution substantially contains carbonate and/or hydroxyl ions as anions.

4. A process according to claim 1, characterized in that the Group VIII metal is nickel.

5. A process according to claim 1, characterized in that the Group VIII metal is cobalt.

6. A process according to claim 1, characterized in that the Group VI (B) metal is molybdenum.

7. A process according to claim 1, characterized in that the Group VI (B) metal is tungsten.

8. A process according to claim 1, characterized in that the ammoniacal solution contains Group VIII and Group VI (B) metal ions in a weight ratio of 40:1 and 1:5.

9. A process according to claim 8, characterized in that the weight ratio of Group VIII to Group VI (B) metal ions is between 1:1 and 1:3.

10. A process according to claim 1 wherein the ammoniacal solution has an initial pH of 11.0 and 12.5.

11. A process according to claim 10 wherein the pH does not drop below 8.5–9.0 in evaporating to dryness.

12. A process according to claim 2 wherein the ammoniacal solution contains carbonate or hydroxyl ions, the Group VIII metal is nickel or cobalt and the Group VI (B) metal is molybdenum or tungsten.

* * * * *